J. S. SMITH.
VEHICLE SPRING.
APPLICATION FILED AUG. 29, 1913.
1,111,924.
Patented Sept. 29, 1914.
2 SHEETS—SHEET 1.
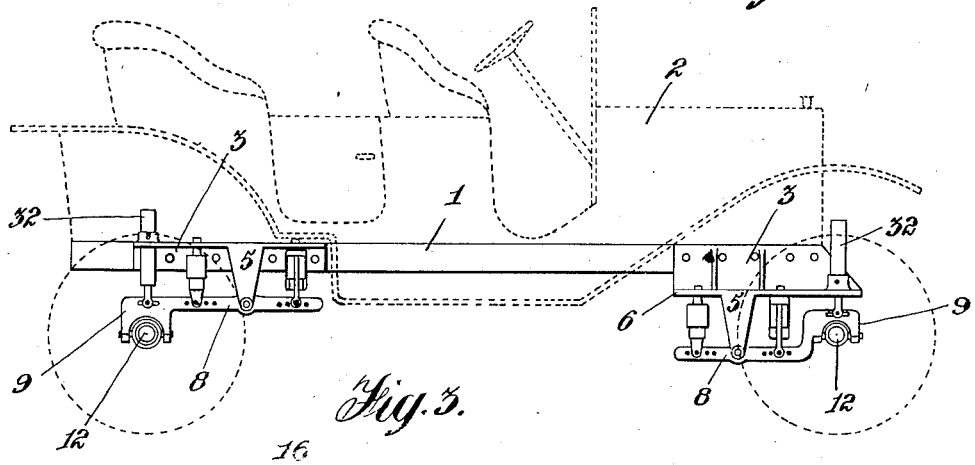
Fig. 1.
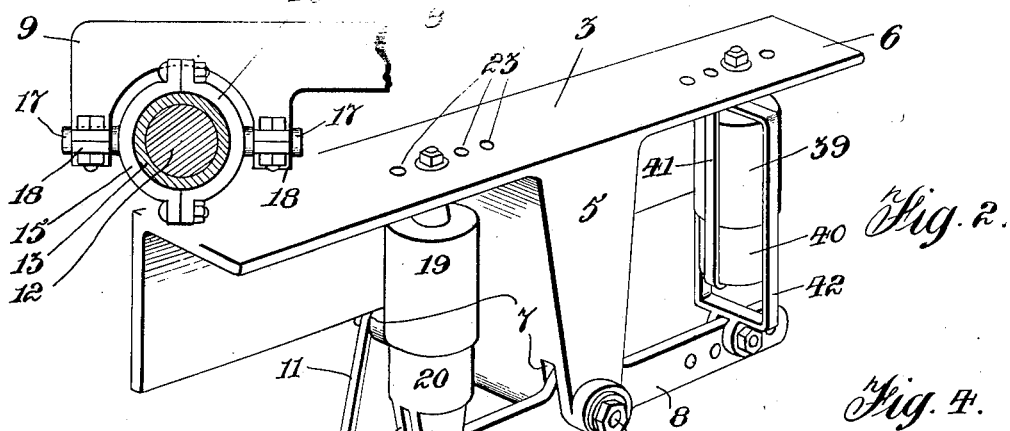
Fig. 3.
Fig. 2.
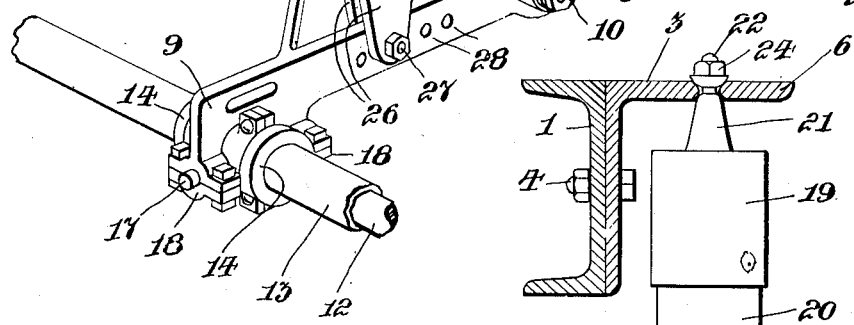
Fig. 4.
Witnesses.
Inventor.
J. S. Smith
Pigeon, Pigeon & Davis
Attorneys.

J. S. SMITH.
VEHICLE SPRING.
APPLICATION FILED AUG. 29, 1913.
1,111,924.
Patented Sept. 29, 1914.
2 SHEETS—SHEET 2.
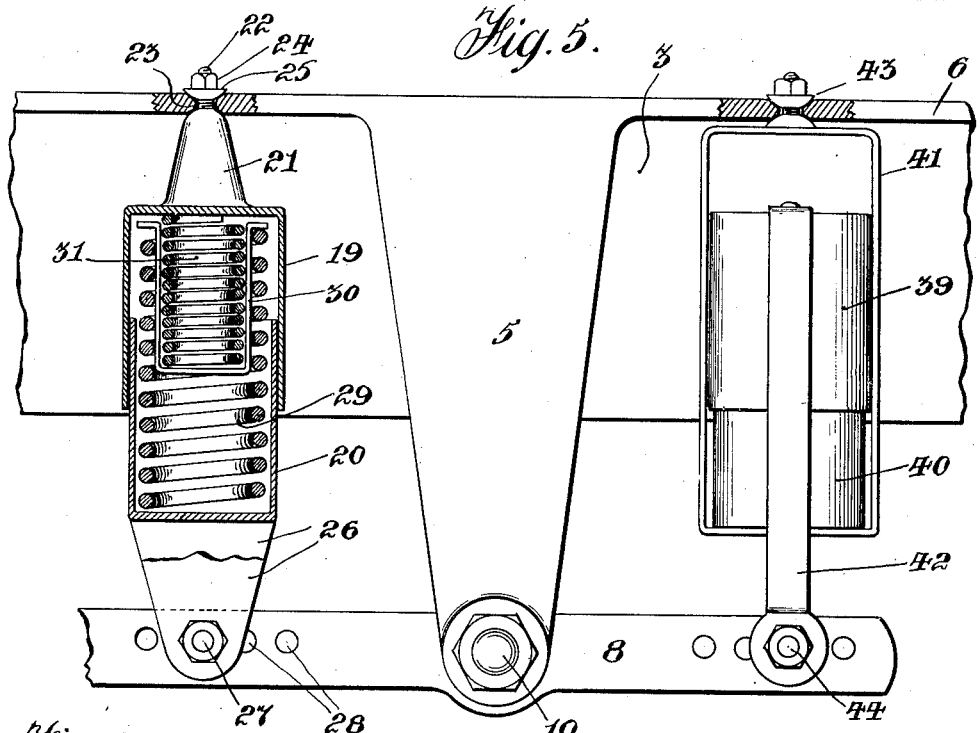
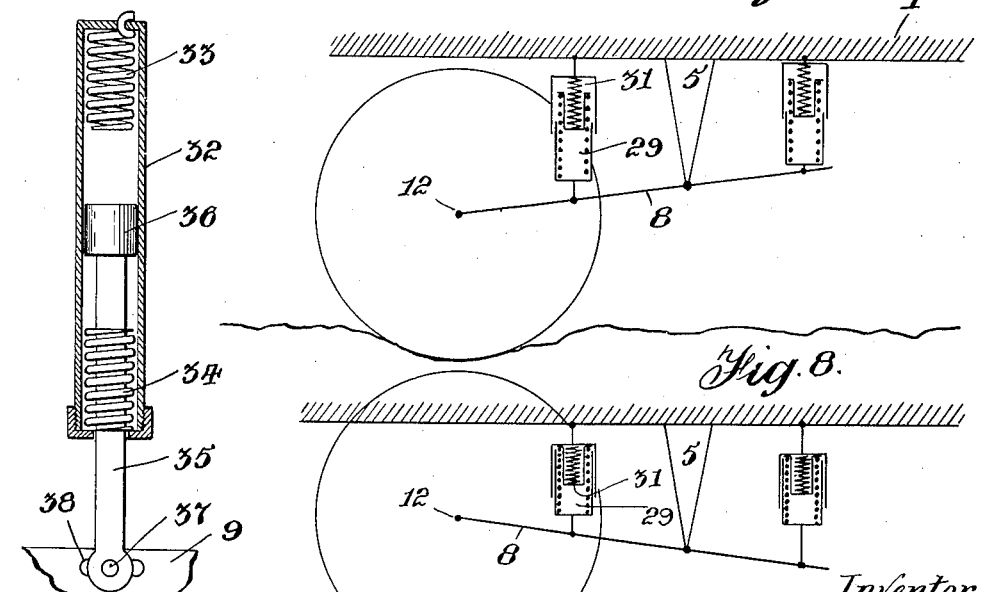
Witnesses
M. Patenaude
M. Brennan
Inventor
J. S. Smith
by Pigeon, Pigeon & Davis
Attorneys

UNITED STATES PATENT OFFICE.

JAMES SAMUEL SMITH, OF MONTREAL, QUEBEC, CANADA.

VEHICLE-SPRING.

1,111,924.  Specification of Letters Patent.  Patented Sept. 29, 1914.

Application filed August 29, 1913. Serial No. 787,364.

*To all whom it may concern:*

Be it known that I, JAMES SAMUEL SMITH, a subject of the King of Great Britain, and resident of 2678 Waverly street, in the city of Montreal, in the Province of Quebec, in the Dominion of Canada, have invented certain new and useful Improvements in Vehicle-Springs; and I do hereby declare that the following is a full, clear, and exact description of the same.

The invention relates to improvements in vehicle springs and has for its object the provision of a device for adaptation to moving vehicles of all kinds, but more particularly for automobiles, to prevent the discomfort to passengers caused by the bouncing of the vehicle over uneven roads.

Briefly the invention consists in dispensing with the ordinary bow springs and supporting the axles upon levers pivoted to the chassis or body of the car and providing springs of a special construction between said lever and car body, and further in arranging these springs adjustable so as to vary their supporting weight when necessary.

Further important features are the provision of a special form of check spring or bumper and a special form of connection between the levers and axles to allow for the irregular movements of the wheels and axle of an automobile.

The invention is illustrated in the accompanying drawings in which—

Figure 1 shows a side view of a chassis with front and rear springs according to this invention attached thereto, the automobile and wheels being indicated by dotted lines. Fig. 2 is a perspective view of the spring mechanism according to the invention and a portion of the rear axle. Fig. 3 is a side view of the outer end of one of the rear spring levers showing its connection to the axle. Fig. 4 is a cross sectional view through one side of the chassis showing the means for securing the spring mechanism thereto. Fig. 5 is an enlarged sectional side view of the spring mechanism with parts broken away. Fig. 6 is a longitudinal section through the bumper spring casing showing also its connection to the spring lever. Fig. 7 is a diagrammatic view illustrating the action of the springs when one wheel is passing over a depression in the roadway and Fig. 8 is a diagrammatic view showing the action of the springs when a wheel is passing over a lump in the roadway.

Like numerals of reference indicate corresponding parts in each figure.

Referring to the drawings, 1 indicates the chassis of an automobile supporting the body 2 in the ordinary manner.

3 is an angle bracket secured to the chassis 1 by bolts 4 at intervals and with its flange projectiong outwardly. There are two of these brackets oppositely placed on opposite sides of the chassis and as both are of the same construction and support the wheel in exactly the same manner it is sufficient to herein describe the details and action of one of the spring mechanisms supported from the bracket 3.

5 is a pivot boss depending from the outwardly extending flange 6 of the bracket 3 and of fairly wide construction at its extremity where it is provided with lever slots 7 at each end.

8 is a spring lever having the forked outer end 9 and intermediately pivoted in one of the slots 7 to the bracket 5 by the pivot 10, said lever having an extension or brace 11 extending from a point adjacent to the forked end 9 and pivoted at its other end in the other slot 7, this extension being designed to brace the lever 8 against lateral movement while permitting it to freely swing on the pivot 10.

12 is the rear axle running in the stationary casing 13 as customary, said casing having the spaced rigid collars 14 near its ends between which are secured the two halves 15 and 16 of a sleeve adapted to freely turn on the axle casing between said collars and each half having the outwardly extending trunnions 17 pivotally secured in the bearings 18 of the forked end 9 of the lever 8. It will thus be seen that if one wheel only rises over a lump on the roadway, the axle can freely tip at that end without strain on the lever 8, the trunnions 17 permitting this movement and the sleeve very slightly turning on the axle casing.

19 and 20 are the two parts of a telescoping spring casing adapted to contain the supporting springs, the half 19 having the boss 21 with a hemispherical end from which leads the pin 22 passing through one of the holes 23 in the flange 6 and being secured therein by the nut 24 threaded on said pin against a hemispherical washer 25, thus permitting the casing 19 a little lateral swing. The spring casing half 20 is provided with the pair of depending lugs 26 engaging the lever 8 between its pivot and outer end by the cross bolt 27 extending through said lugs and one of the holes 28. The holes 23 and 28 are in vertical alinement so that the casing may be secured to any pair of said holes, thus adjusting its distance toward or away from the axle.

29 is a heavy helical spring nicely fitting the casing 20 and extending into the casing 19, said spring at its upper end supporting a U-shaped member 30 which is dropped thereinto and supported from its upper end.

31 is a lighter helical spring abutting the lower end of said U-shaped member at one end and the top of the casing 19 at its other end.

In the drawings I have shown a pair of supporting springs and casing, one, (just described) between the pivot 10 and the forked end 9, and the other at the other side of the pivot 10 between the lever and the flange 6, but it must be understood that the invention is just as practicable with one of said springs just described and it may be well therefore to now describe the action of the said spring-mechanism as the additional spring is merely a duplication with necessary details of construction to accomplish such duplication.

When the vehicle is at rest or traveling on smooth road the lever 8 is approximately horizontal as shown in Figs. 1, 3 and 5 and in this position the lighter spring 31, which may be termed the reserve spring, is, as clearly shown in Fig. 5 compressed to an extent just about supporting the vehicle without calling upon the spring 29. When the vehicle comes to a piece of rough road containing a depression such as shown in Fig. 7, the wheel is pushed into the depression by the reserve spring 21 tending to expand, this occurring so quickly that the vehicle does not have time to fall or at any rate very little and when the wheel again comes out of the depression the spring 31 is again compressed to the extent shown in Fig. 5, while, if the vehicle comes to a lump in the ground as shown in Fig. 8 the wheel in riding over said lump pushes up the lever 8 and then compresses the spring 29 within the casing the reserve spring 31 having already been compressed to its full extent. On reaching smooth road again the lever and spring will resume the normal position shown in Fig. 5.

It has been found in experiments that by the use of the reserve spring in combination with heavier spring 29 and the particular lever arrangement, there is scarcely any bumping or bouncing of the vehicle as the vehicle is let down lightly into depressions and forced up gently over bumps, in fact the same results cannot be obtained with the use of a single spring or two springs of the same weight.

It is obvious that when the spring casing is adjusted nearer to the pivot 10, it is capable of sustaining less weight in the vehicle owing to the greater leverage obtained for compression and this is important in avoiding bouncing of the vehicle, it being well known that to obtain the best results from an automobile only the regulated number of passengers must be carried. With this invention, however the vehicle may carry any number of passengers up to its capacity, providing the spring casing is adjusted along the lever to make its carrying capacity conform to the particular load.

32 is the bumper spring casing supported in a vertical position at the outer end of the bracket 3 and containing the bumper springs 33 and 34, one at each end.

35 is a rod extending into the casing 32 through its lower end and having a plunger 36 adapted to contact the springs 33 and 34, the lower end of said rod being connected to the forked end 9 of the lever 8 by a pin 37 passing through said rod and through the slot 38 in the lever, the latter permitting the rod to be forced up in a vertical line, while the lever swings. Just before the lever 8 reaches the predetermined limit of its upward movement the plunger will abut the bumper spring 33 and similarly, just before the lever reaches the limit of its downward movement the plunger 36 will abut the spring 34 and thus avoid jolting. It must be understood however, that these bumper springs will only be contacted in extreme circumstances and are to avoid shock to the other parts under such circumstances.

It has been previously explained that the spring mechanism is duplicated at the inner end of the lever 8 and this is accomplished by supporting the spring casings 39 and 40 (containing springs 29 and 31 exactly similar in construction and action to those already described) on U-shaped frames 41 and 42, the former connecting the casing 40 to the flange 6 by the ball joint 43 and the latter connecting the casing 39 to the lever by the pivot 44. It will thus be seen that when the springs in the casings 19 and 20 are compressed the springs in the casings 39 and 40 will be compressed correspondingly and whatever occurs in the casings 19 and 20 will be duplicated in the casings 39 and 40 and said casings are adjustable along the lever exactly as the casings 19 and 20.

The construction of the spring mechanism for supporting the front wheel is practically the same as that for supporting the rear wheels and there is no need to describe such construction in detail, but it may be mentioned that it is preferable in the case of the rear wheels to arrange the pivot point 10 in front of the rear axle and in the case of the front wheels to make the said pivot point behind the axle, also in the case of the rear wheels to make the pivot above the axle and in the case of the front wheels to make the pivot point below the axle in order that there shall be no longitudinal pressure, but a free swinging of the levers when the wheels meet with lumps or obstructions on the roadway.

The bracket 3 in the case of the front spring mechanism is reversed in order to bring the lever lower down, that is to say, its flange 6 extends outwardly from its lower edge instead of its upper edge. Further, the check spring casing 32 necessarily is secured to the front end of said bracket.

I wish it to be understood that the details of construction herein described may be more or less changed as desirable, so long as I do not depart from the invention as covered in the following claims for novelty.

Further, while I have shown the levers 8 as straight levers they may be bent or curved into various shapes so long as the same action on the spring is secured.

What I claim is:—

1. In a vehicle spring, the combination with the vehicle frame and wheel axle of a bracket rigidly secured to said frame, a lever pivoted to said bracket to swing vertically and having a forked outer end, a sleeve loosely encircling said axle and having stub shafts engaging and forming pivotal connection with said forked end and a compression spring disposed between said lever and bracket.

2. In a vehicle spring, the combination with the vehicle frame and wheel axle of an angular bracket secured to said frame and having a horizontally extending flange and a depending pivot boss, a lever secured to the lower end of said pivot boss and connected at its outer end to said axle, a telescoping spring casing formed of a pair of cup shaped parts, the upper one of said parts being pivotally connected to said flange and the lower one of said parts being pivotally connected to said lever, a compression spring within said casing and means for adjusting said casing toward or away from said pivot boss.

3. In a vehicle spring, the combination with the vehicle frame and wheel axle of a bracket secured to said frame, a lever intermediately pivoted in said bracket, means for connecting said lever at one end to said axle, a compression spring disposed between said bracket and lever between the pivot point and axle, a compression spring on the other side of said pivot between said bracket and lever, and frames connected to said bracket and lever insuring the corresponding compression of said latter spring with the former spring.

4. In a vehicle spring, the combination with the vehicle frame and wheel axle of a bracket secured to said frame and having a depending pivot boss, a lever horizontally pivoted to one side of said pivot boss and connected to said axle at its outer end and having a diagonally extending brace member extending from its outer end and pivotally connected to the other side of said pivot boss, and a compression spring disposed between said lever and said bracket.

5. In a vehicle spring, the combination with the vehicle frame and wheel axle of a bracket secured to said frame, a lever pivoted in said bracket and connected at its outer end to said axle, a compression spring disposed between said bracket and said lever, a pair of distanced bumper springs suitably supported and a connection from said lever adapted to contact one of said bumper springs for compression just before said lever reaches its limit of movement in an up or down direction.

6. In a vehicle spring, the combination with the vehicle frame and wheel axle of a bracket secured to said frame, a lever pivoted in said bracket and connected to said axle at its outer end, a spring adapted to be compressed by weight on the car, disposed between said lever and said bracket, a bumper spring casing rigidly and vertically supported by said bracket, a pair of distanced bumper springs arranged one at each end of said casing, a plunger within said casing, a downwardly extending rod leading through the lower end of said casing and means for coupling the lower end of said rod to the outer end of said lever.

Signed at Montreal, Quebec, Canada, this fifteenth day of July, 1913.

JAMES SAMUEL SMITH.

Witnesses:
M. PATENAUDE,
C. PATENAUDE.